(12) United States Patent
Harada

(10) Patent No.: US 6,574,019 B1
(45) Date of Patent: Jun. 3, 2003

(54) TRANSMISSION SYSTEM, AND STATION UNIT AND REMOTE UNITS TO BE USED THEREIN

(75) Inventor: Shigekazu Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/468,340

(22) Filed: Dec. 21, 1999

(30) Foreign Application Priority Data

Dec. 28, 1998 (JP) .......................................... 10-374782

(51) Int. Cl.[7] ............................................... H04J 14/08
(52) U.S. Cl. ........................ 359/136; 359/137; 359/125
(58) Field of Search ............................. 359/125, 137, 359/167, 120–121; 370/465, 337

(56) References Cited

U.S. PATENT DOCUMENTS

| | | | | |
|---|---|---|---|---|
| 4,726,010 A | * | 2/1988 | Ali et al. ..................... | 359/125 |
| 5,398,129 A | * | 3/1995 | Reimann ..................... | 359/137 |
| 5,572,349 A | * | 11/1996 | Hale et al. .................. | 359/137 |
| 5,606,555 A | * | 2/1997 | Singer ......................... | 370/465 |
| 5,896,213 A | * | 4/1999 | Nagahori et al. ........... | 359/137 |

FOREIGN PATENT DOCUMENTS

| | | |
|---|---|---|
| EP | 0 817 525 A2 | 1/1998 |
| JP | 10-224368 | 8/1998 |

OTHER PUBLICATIONS

European Search Report dated Feb. 5, 2001.
Japanese Office Action dated May 9, 2000 with partial translation.
Treatises of the Electronic Communications Society, B–839 (Aug. 8, 1996), Tatsuya, Y., Investigation of Variable Rate PDS in an ATM network, P. 324.

* cited by examiner

Primary Examiner—Kinfe-Michael Negash
(74) Attorney, Agent, or Firm—McGinn & Gibb, PLLC (57) ABSTRACT

A transmission system includes a plurality of remote units in communication with a station unit, wherein communication is with fixed length cells in the upward direction from the remote units to the station unit by a TDMA system, and in the downward direction from the station unit to the remote units by a TDM system. The station unit is adapted to detect whether one of the plurality of remote units is in a standby state and is responsive to a detection of one of the plurality of the remote units being in a standby state to allocate bands of communication from the remote unit in the standby state to a remote unit in a normal state.

13 Claims, 5 Drawing Sheets

TRANSMISSION SYSTEM, AND STATION UNIT AND REMOTE UNITS TO BE USED THEREIN

FIELD OF THE INVENTION

This invention pertains to a transmission system, and a station unit and remote units to be used in the transmission system, and more particularly to a transmission system, wherein plural remote units are connected to a station unit in star form, and in regard to the transmission system communicating between the station unit and the remote units by using fixed length cells, specifically, communication in the direction from the remote units to the station unit (henceforth, described as upward) being done in TDMA (Time Division Multiple Access) system, while communication in the direction from the station unit to the remote units (henceforth, described as downward) being done in TDM (Time Division Multiplex) system.

BACK GROUND OF THE INVENTION

Figure 1:
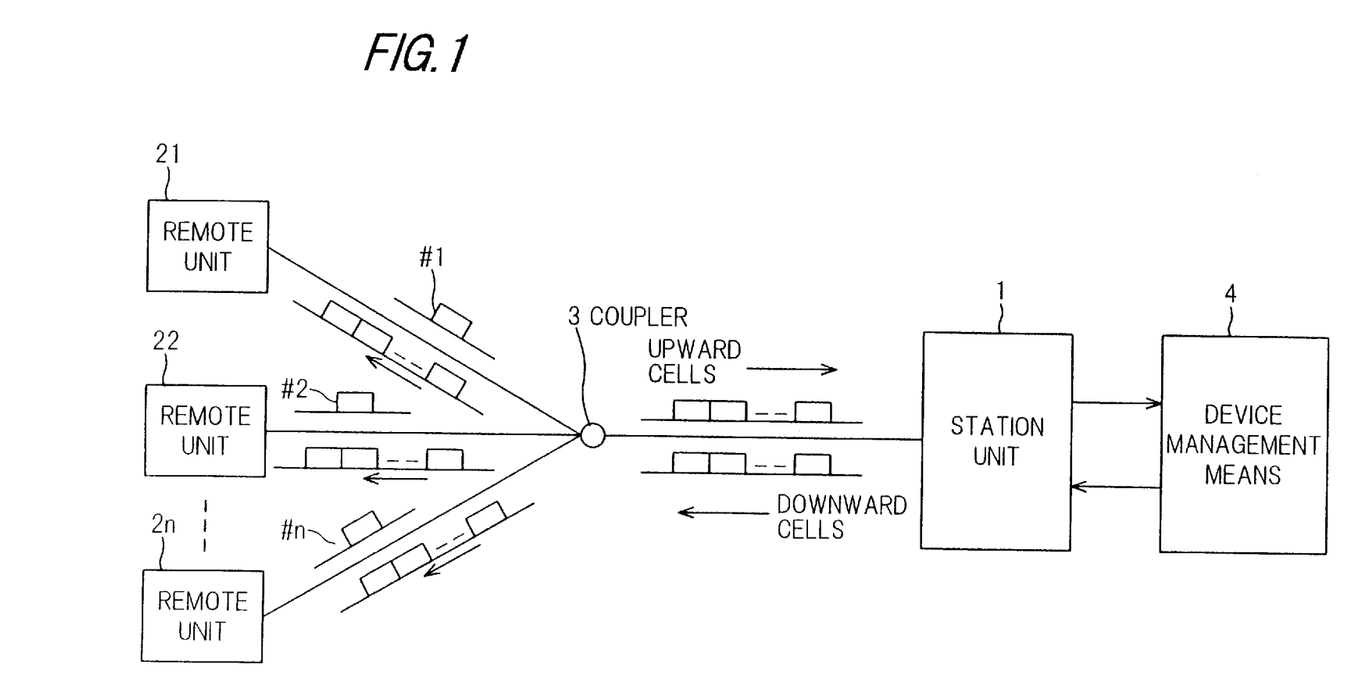
FIG. 1 is a block diagram showing a general structure of a transmission system.
Figure 2:
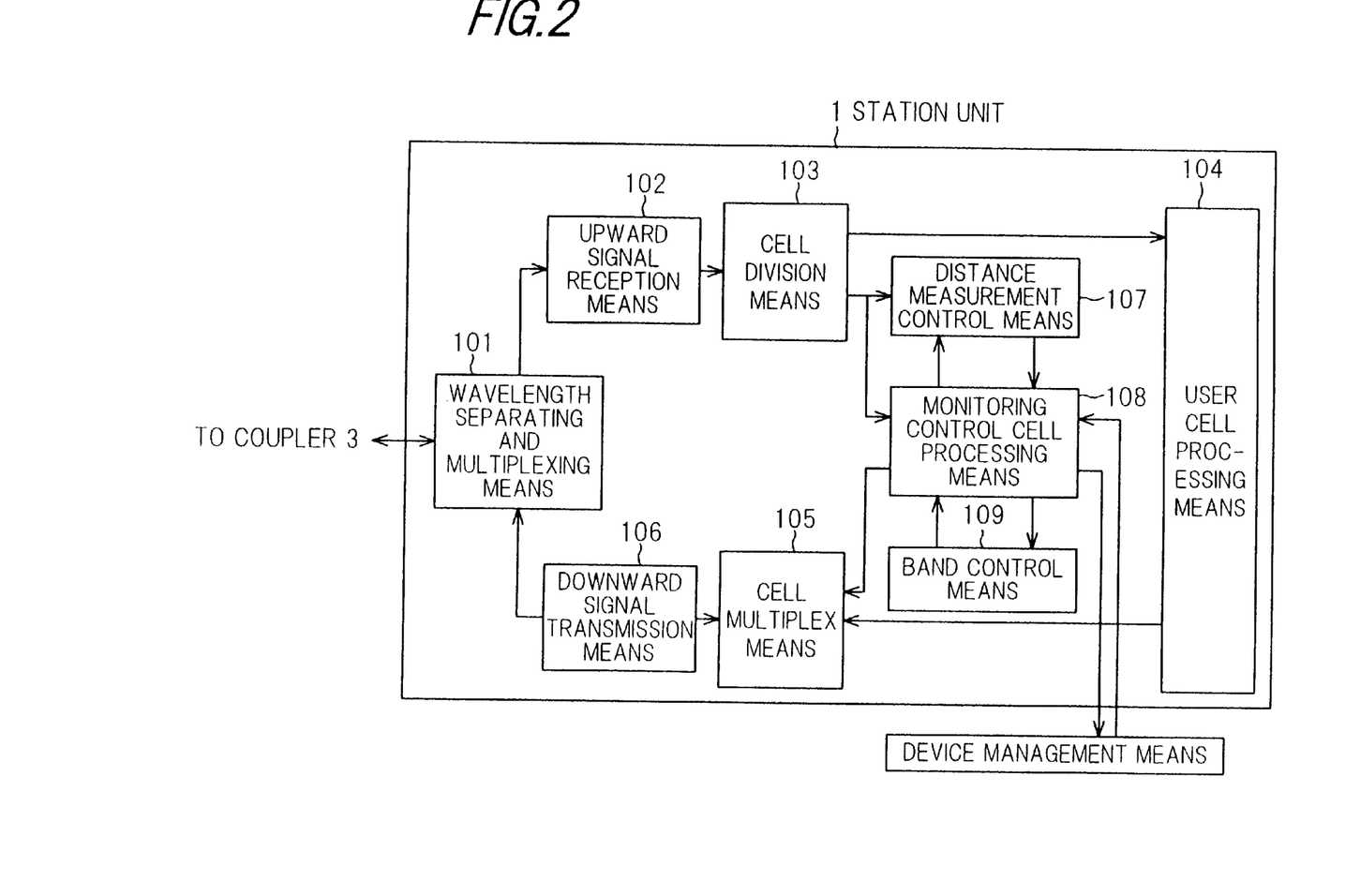
FIG. 2 is a block diagram showing a structure of a general station unit in a transmission system.
Figure 3:
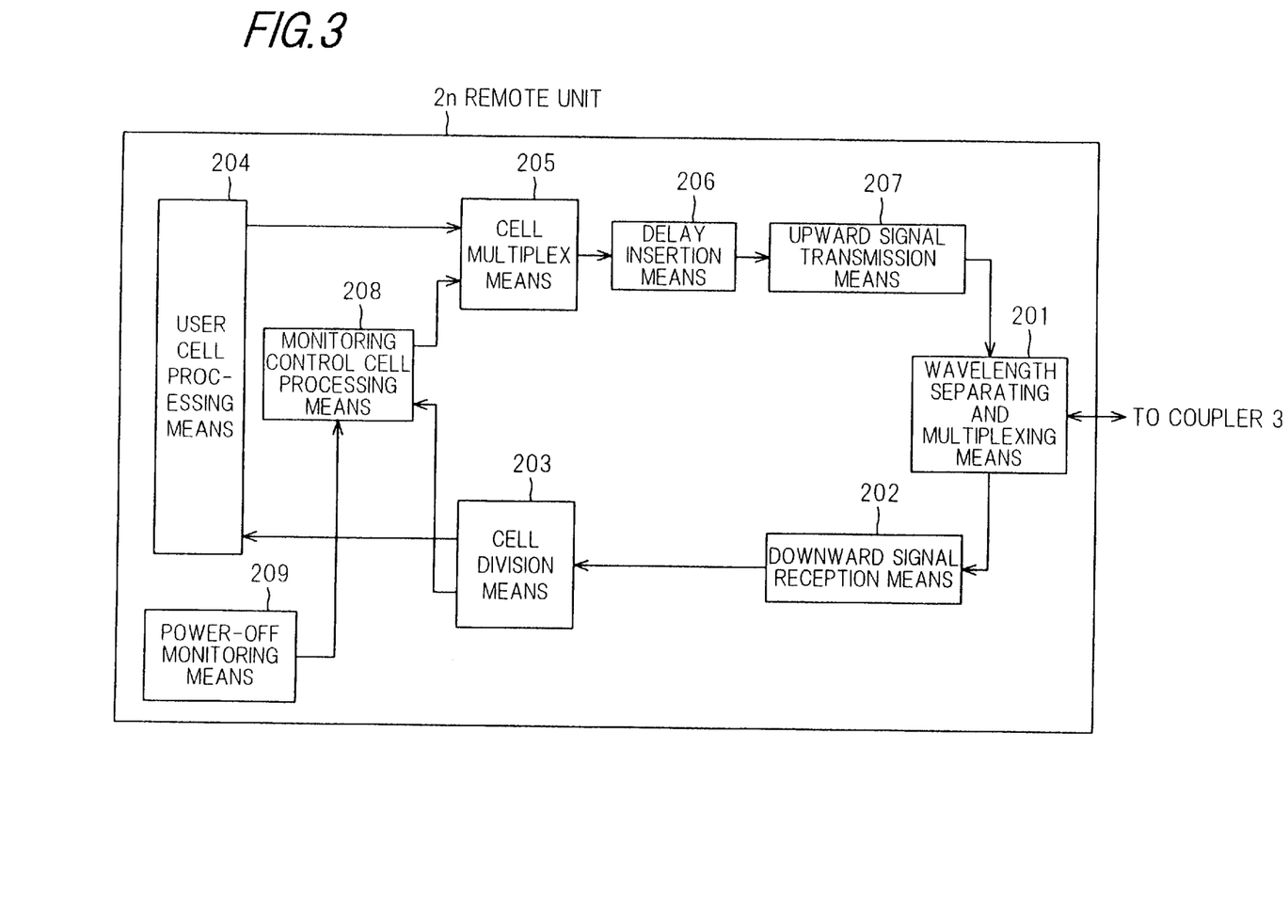
FIG. 3 is a block diagram showing a structure of a remote unit in a transmission system of the prior art.

One example of a conventional transmission systems is shown in FIG. 1. Also, a structure of a general station unit in this transmission system is shown in FIG. 2, and that of a remote unit in FIG. 3.

This optical transmission system, between one station unit 1 and n remote units 21~2n with different transmission length, carries out one-core two-way communication by using different wave bands. In other words, broadcasting-type communication with fixed length cells is done in the downward direction, while TDMA system communication with fixed length cells is used in the upward direction.

Since in an optical transmission system of this type, optical signals are branched and linked with a coupler 3, it is necessary to include delay control so that upward cells from each remote unit, 21~2n, may not collide. Thus, when each remote unit, 21~2n, starts up, one carries out distance measurement control for measuring the transmission distance by the command of the station unit 1, and sets a delay for each remote unit, 21~2n.

Allocation of upward bands to each remote unit, 21~2n, is always commanded by the station unit 1 to each remote unit, 21~2n. In an upward time slot, an area for distance measurement is allocated appropriately, and the station unit 1 receives monitoring control cells transmitted by a certain remote unit in this area, and the bands are not allocated to other remote units. Each remote unit, 21~2n, is, however, either in the state of power-off or power-on. In the power-off state, monitoring of the transmission line between the remote unit and the station unit 1 and the state of the remote unit itself are not possible. Thus, when it switches from a power-off state to a power-on state, after distance control by the station unit 1, it switches to an operation state where communication is possible, transmitting and receiving user cells having user information, and also monitoring control cells for monitoring the transmission line between the remote unit and the station unit 1 and the remote unit itself. When the user does not use the band, it transmits idle cells upward for adjusting the rate.

However, in the conventional transmission system, even when a user does not use upward bands, there is no means for informing the station unit 1 of it, and it transmits idle cells to the allocated bands, and in order to monitor the transmission line between the station unit 1 and the remote unit or the state of the remote unit itself, the station unit and the remote units 2n need to be in a normal communication state, resulting in a problem of inefficient utilization of the upward bands.

Once the power of a remote unit is turned off, it needs distance measurement control after the power is turned on again. Thus even if one tries to save power consumption without user communication, it causes a problem that the restart-up of the remote unit takes time, once its power is turned off.

SUMMARY OF THE INVENTION

Thus, an object of this invention is to provide a transmission system, a station unit and remote units, which can monitor the transmission lines and the remote units under conditions of controlled power consumption.

Another, other object of this invention is to provide a transmission system, a station unit, and remote units, which intend to utilize effectively the bands for user cells.

Further object of this invention is to provide a transmission system, a station unit, and remote units, which shorten the time for restarting user cell communication.

According to the first feature of the invention, a transmission system comprises plural remote units connected with a station unit in star form, each communicating with fixed length cells in the upward direction from the remote units to the station unit by TDMA system, and in the downward direction from the station unit to the remote units by TDM system, wherein when the station unit detects a remote unit in the standby state so as to save power consumption, it allocates the bands allocated to the remote unit in the standby state to a remote unit in a normal state, and transmits and receives monitoring control information periodically to and from the remote unit in a standby state so as to monitor the transmission line and the state of the remote unit, allocating again the bands according to its result.

According to the second feature of the invention, a transmission system comprises plural remote units connected with a station unit in star form, each communicating with fixed length cells in the upward direction from the remote units to the station unit in TDMA system, and in the downward direction from the station unit to the remote units by TDM system, wherein a remote unit turns into a standby state, it transmits and receives a monitoring control cells periodically to and from the station unit so as to monitor the transmission line and the remote unit itself, and the station unit controls so that the bands allocated to the remote unit may be allocated to a remote unit in a normal state excluding the bands for transmitting upward monitoring control cells when the monitoring control cells indicate the standby state, and the remote unit concerned may be returned to the band allocation in a normal state, when the remote unit is released from the standby state.

According to the third feature of the invention, a station unit, in a transmission system comprises plural remote units connected with the station unit in star form, each communicating with fixed length cells in the upward direction from the remote units to the station unit by TDMA system, and in the downward direction from the station unit to the remote units by TDM system, comprises means for separating the upward signal input from a remote unit and the downward signal output to a remote unit, means for receiving the upward signal thus separated means for dividing the received upward signal into user cells and monitoring control cells, means for controlling band allocation according to the band allocation command signal and outputting the band allocation information, means for processing monitoring control cell wherein upward monitoring control cells from the dividing means are input to execute terminal processing for collecting a transmission-line warning or a remote-unit warning, and also, if a power-off or a standby of a remote unit is indicated by the monitoring control cells, the band allocation command signal is output to get the band allocation information, means for processing termination of user cells input from the dividing means and generation of user cells, means for multiplexing user cells from the user-cell processing means and monitoring control cells from the monitoring control cell processing means, and means for transmitting an output of the multiplexing means via the dividing means.

According to the fourth feature of the invention, a remote unit, in a transmission system comprises plural remote units connected with a station unit in star form, each communicating with fixed length cells in the upward direction from the remote units to the station unit by TDMA system, and in the downward direction from the station unit to the remote units by TDM system, comprises a wavelength separating and multiplexing means for separating the downward signal input from the station unit and the upward signal output to the station unit, an downward signal reception means for receiving the downward signal after the signal separating, a cell division means for dividing the received signal concerned into user cells and monitoring control cells, a power-off monitoring means for detecting a power-off state of the remote unit, a standby state monitoring means for detecting the remote unit being in the state of power-off, a monitoring control cell processing means wherein downward monitoring control cells are input from the cell division means for getting band allocation information to output a cell transmission command signal, and also a power-off indication signal is input from the power-off monitoring means and a standby state indication signal from the standby state monitoring means to generate upward monitoring control cells, a user cell processing means for terminal processing of user cells input from the cell division means and generation processing of user cells, a cell multiplex means for executing cell multiplex processing of user cells from the user cell processing means and monitoring control cells from the monitoring control cell processing means according to a cell transmission command signal from the monitoring control cell means, and an upward signal transmission means for transmitting an output of the cell multiplex means concerned via the cell division means.

BRIEF DESCRIPTION OF THE DRAWINGS

The invention will be explained in more detail in conjunction with the appended drawings, wherein.

DESCRIPTION OF THE PREFERRED EMBODIMENT

Next, the preferred embodiment of the invention will be described with reference to the drawings. At first, a general structure of the transmission system in this invention will be described with reference to FIG. 1. An optical transmission system shown in FIG. 1 carries out one core two-way communication between a station unit 1 and n remote units with different transmission distances, 21~2n, by use of different wave bands. In other words, broadcasting-type communication by TDM system with fixed length cells is carried out in the downward direction, and communication by TDMA with fixed cells in the upward direction.

And, since in an optical transmission system of this type, optical signals are branched and linked with a coupler 3, it is necessary to include a delay control so that upward cells from each remote unit, 212n, may not collide. Thus, when each remote unit, 21~2n, starts up, one carries out distance measurement control for measuring the transmission distance by the command of the station unit 1, and sets a delay for each remote unit, 21~2n. Allocation of upward bands to each remote unit, 21~2n, is always commanded by the station unit 1 to each remote unit, 21~2n. In an upward time slot, an area for distance measurement is allocated appropriately, and the station unit 1 receives monitoring control cells transmitted by a certain remote unit in this area, and the bands are not allocated to other remote units. Each remote unit, 21~2n, is, however, either in the state of power-off or power-on. In the state of power-off, monitoring of the transmission line between the remote unit and the station unit 1 and that of the remote unit itself are not possible. Thus, when it switches from a power-off state to a power-on state, after distance control by station 1, it switches to an operation state where communication is possible, and transmits and receives user cells having user information, also transmitting and receiving monitoring control cells for monitoring the transmission line between the remote unit and the station 1 and the remote unit itself. When the user does not use bands, it transmits idle cells upward for adjusting the rate.

In an optical transmission system of this invention, wherein plural remote units and a station unit are connected in star form, and communication between the station unit and the remote units is carried out by use of fixed length cells, and specifically, communication in the direction from the remote units to the station unit (henceforth, described as upward) is carried out by TDMA (Time Division Multiple Access) system, while communication in the direction from the station unit to the remote units (henceforth, described as downward) is carried out by TDM (Time Division Multiplex) system, the station unit detects a standby state of any arbitrary remote unit so as to save power consumption, permitting the bands allocated to the remote unit switched into a standby state to be allocated to other remote unit in a normal state, and transmits and receives monitoring control information periodically to and from the remote unit in a standby state so as to monitor the transmission line, etc. and the state of the remote unit.

A transmission system of this invention, in addition to two states above, is characterized by having a standby state. In a standby state of a remote unit, 21~2n, transmission and reception of user cells and idle cells are not carried out, but transmission and reception of monitoring control cells at appropriate intervals allow monitoring of the transmission line to the station unit and the remote unit itself, even when the user of a remote unit, 21~2n is not getting service.

Figure 4A:
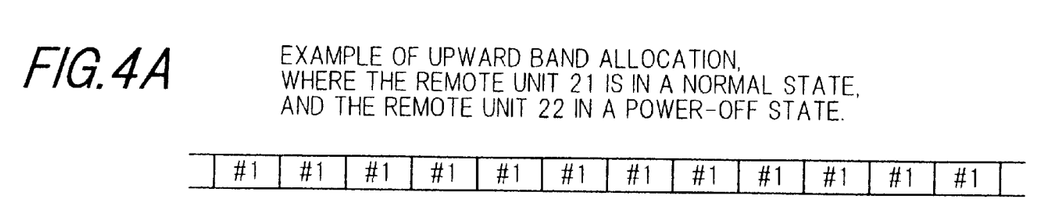
FIGS. 4A to 4D are diagrams showing difference in band allocation according to different states of the remote unit.
Figure 4B:
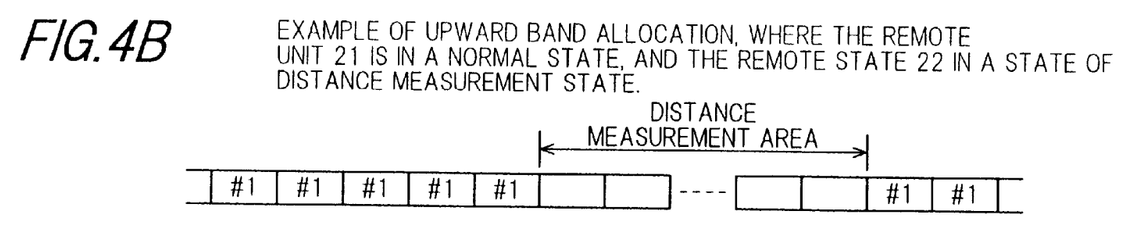
Figure 4C:
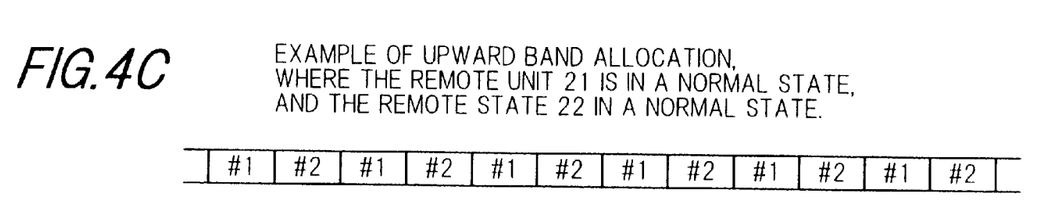
Figure 4D:
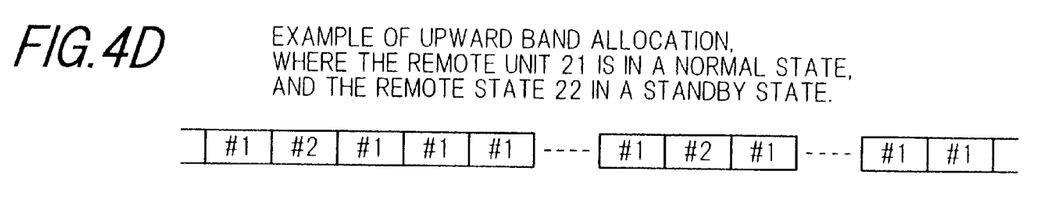

FIG. 4D shows an example of upward band allocation. Here is shown a case where there are two remote units connected to the station unit 1, and #1 and #2 indicate the bands allocated to the remote unit 21 and the remote unit 22 respectively. For example, if the remote unit 22 turns from a normal state into a standby state, the bands allocated to the remote unit 22 in FIG. 4C may be all allocated to the remote unit 21 excluding the bands for monitoring control cells.

Figure 5:
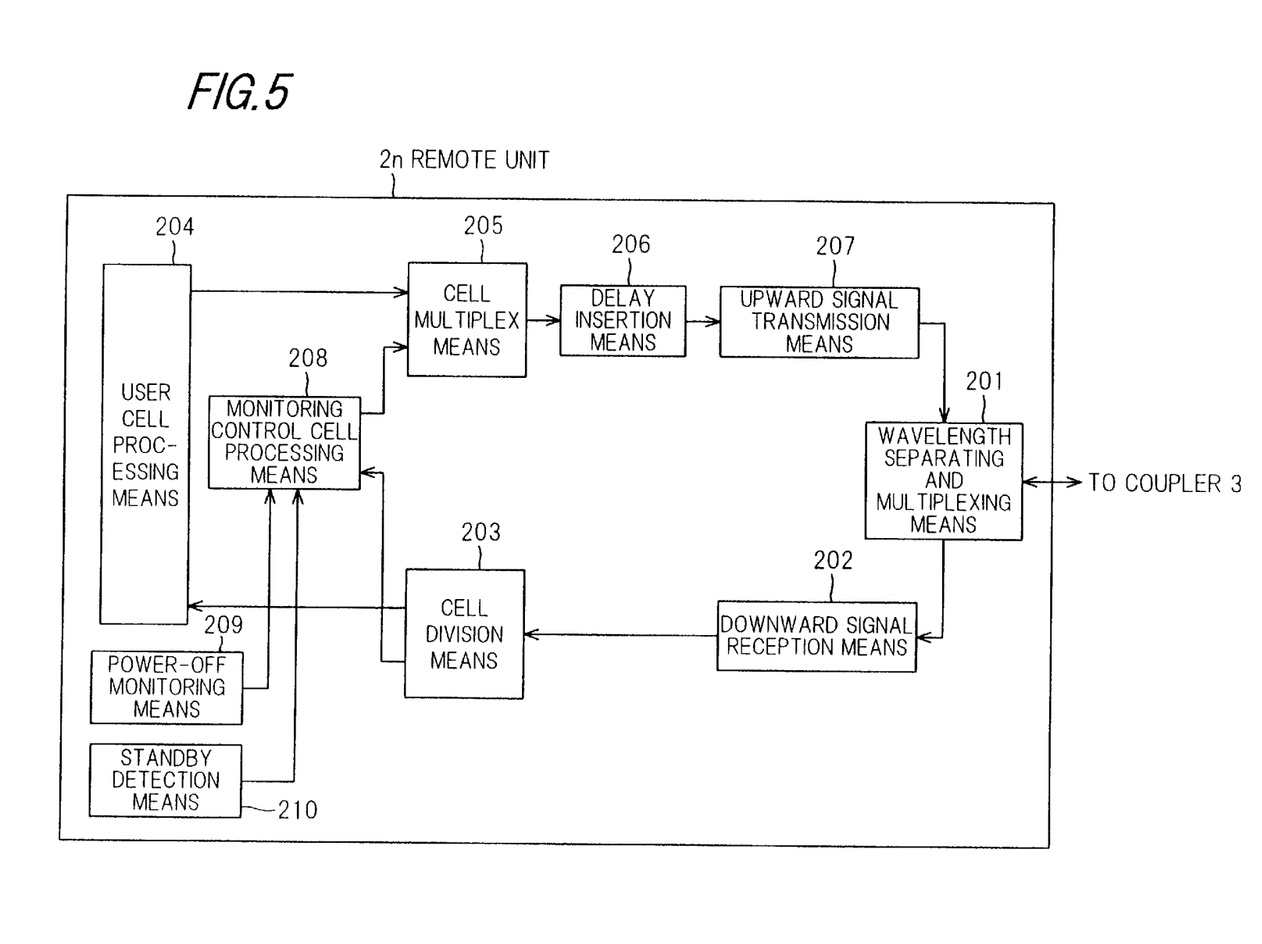
FIG. 5 is a block diagram showing a structure of a remote unit in an optical transmission system in a preferred embodiment of this invention.

With reference to FIG. 5, the feature of an optical transmission system according to this invention is described as follows. The remote unit 2n, detecting a standby state by the standby state detecting means 210, indicates the standby state on the upward monitoring control cells by the monitoring control cell processing means 208 so as to transmit it to the station unit 1.

In the station unit 1, when one receives the upward monitoring control cells indicating the standby state by the monitoring control cell processing means 108, the band control means 109 executes band control so that the bands allocated to the remote unit 2n until then, may be allocated to other remote unit in a normal state, excluding the bands for upward monitoring control cell transmission.

On the other hand, the remote unit 2n, detecting that the standby state is released by the standby-state detecting means 210, indicates a standby-state release by the monitoring control cell processing means 208 so as to transmit it to the station unit 1.

In the station unit 1, when one receives upward monitoring control cells indicating the standby-state release by the monitoring control cell processing means 108, the band control means 109 executes a band control so that the remote unit 2n may return to band allocation in a normal state.

Next, with reference to FIG. 2, the structure of a station unit 1 will be explained.

A wavelength separating and multiplexing means 101 divides and multiplexes an upward optical signal input from the remote units 21~2n via the coupler 3 and output in the upward signal reception means 102, and a downward signal input from the downward signal transmission means 106 and output in the remote units 21~2n via the coupler 3.

The upward signal received by the upward signal reception means 102 is divided into user cells and monitoring control cells by the cell division means 103, and the user cells are output to the user cell processing means 104, while the monitoring control cells are output to the distance measurement control means 107 and the monitoring control cell processing means 108.

The distance measurement control means 107 controls distance measurement according to the distance measurement command signal input from the monitoring control cell processing means 108, and the result of the distance measurement is output to the monitoring control cell processing means 108.

The band control means 109 controls band allocation according to the band allocation signal input from the monitoring control cell processing means 108, and the band allocation information is output to the monitoring control cell processing means 108.

The user cell processing means 104 executes terminal processing of the user cells input from the cell division means 103, and generation processing of the user cells so as to output them in the cell multiplex means 105.

The monitoring control cell processing means 108 executes the terminal processing for collecting a transmission line warning or a remote unit warning by the input of upward monitoring control cells from the cell division means 103, generating a set delay value to the remote unit concerned on the basis of the distance measurement results input from the distance measurement control means 107, inputting the band allocation information from the band allocation control means 109, and generating the downward monitoring control cells to output them to the cell multiplex means 105.

And the monitoring control cell processing means 108 outputs a band allocation command signal to the band allocation control means 109 according to the power-off state indication or the standby-state indication reported by the upward monitoring control cells, so as to get the band allocation information. Further, the monitoring control cell processing means 108 controls startup or stop of the station unit 1 and the remote units 21~2n according to the startup-stop control from the device management means 4, and also reports the control results and the collected warnings to the device management means 4.

The cell multiplex means 105 executes cell multiplex processing of the user cells and the monitoring control cells input so as to output them to the downward signal transmission means 106.

Next, with reference to FIG. 5, a structure of the remote unit 2 according to this invention will be described.

The wavelength separating and multiplexing means 201 executes wavelength division multiplex of a downward optical signal, input from the station unit 1 via the coupler 3 and output to the downward signal reception means 202, and that of an upward optical signal, input from the upward signal transmission means 207 and transmitted to the station unit 1 via the coupler 3.

The downward signal received by the downward signal reception means 202 is divided into user cells and monitoring control cells by the cell division means 203, and the user cells are output to the user cell processing means 204 and the monitoring control cells are output to the monitoring control cell processing means 208.

The power-off monitoring means 209 detects a power-off state to report it to the monitoring control cell processing means 208. The standby state detection means 210, for example, comprising a standby switch etc, detects a standby state so as to report it to the monitoring control cell processing means 208.

The user cell processing means 204 executes terminal processing of user cells input from the cell division means 203, and generation processing of user cells to output them to the cell multiplex means 205.

The monitoring control cell processing means 208 takes in a set delay value and band allocation information by the input of the downward monitoring control cells from the cell division means 203. The set delay value taken in is output to the delay insertion means 206 and a cell transmission command signal based on the band allocation information taken in is output to the cell multiplex means 205.

And, the monitoring control cell processing means 208, by the inputs of a power-off state indication signal from the power-off monitoring means 209 and a standby-state indication signal from the standby-state detection means 210, generates upward monitoring control cells to output them to the cell multiplex means 205.

The cell multiplex means 205, according to the cell transmission command input from the power-off state detection means 208, executes cell multiplex processing of the input user cells and the monitoring control cells, and outputs them to the delay insertion means 206. And, when the user cells and the monitoring control cells are not input, it generates idle cells to send them out.

The delay insertion means 206 executes cell transmission phase control according to the set delay value input from the monitoring control cell processing means 208, and outputs the user cells and monitoring control cells or idle cells to the upward signal transmission means 207.

Next, with reference to FIGS. 1, 2, and 5, the operation of an optical transmission system with a structure as described above will be described. Here, one describes the operation of a case, where two remote units, 21 and 22 are connected with the coupler 3, and the remote unit 21 has been started, being in the normal state of communication with the station unit 1 by means of user cells, and the remote unit 22 is turned on, but not yet being started.

First, upward bands at this point, as shown in FIG. 4A, are allocated only to the remote unit 21. When the device management means 4 gives a start command of the remote unit 22 to the monitoring control cell processing means 108 in the station unit 1, the monitoring control cell processing means 108 outputs a band allocation command signal to the band control means 109 to get band allocation information.

Upward band allocation according to this band allocation information, as shown in FIG. 4B, has a distance measurement area. Then the monitoring control cell processing means 108 generates monitoring control cells having the acquired band allocation information to output them to the cell multiplex means 105, and also outputs a distance measurement command signal to the distance measurement control means 107.

On the other hand, in the remote unit 22, when the monitoring control cell processing means 208 inputs these cells, it outputs upward monitoring control cells and a cell transmission command signal to the cell multiplex means 205. In the station unit, the distance measurement control means 107 receives the monitoring control cells from the remote unit 22 so as to output the distance measurement result to the monitoring control cell processing means 108.

The monitoring control cell processing means 108 generates a set delay value to the remote unit 22 according to the distance measurement result input, and generates monitoring control cells to the remote unit 22 so as to output them to the cell multiplex means 105. The monitoring control cell processing means 208 in the remote unit 22 gets the set delay value reported by the monitoring control cells to output it to the delay insertion means 206, setting an upward cell transmission phase.

Later, the monitoring control cell processing means 108 in the station unit 1 outputs a band allocation signal to the band control means 109, getting band allocation information to the remote units 21 and 22 in a normal state, and reporting band allocation information to each remote unit by use of downward monitoring control cells. Upward band allocation according to this band allocation information is one as shown in FIG. 4C. From then, communication by user cells becomes possible between the station unit 1 and the remote units, 21 and 22.

Next, the operation will be described when the standby detection means 210 in the remote unit 22 detects a standby state under this condition.

When the monitoring control cell processing means 208 inputs a standby-state indication signal from the standby state detection means 210, it gives a standby indication to upward monitoring control cells so as to output them to the cell multiplex means 205.

When the monitoring control cell processing means 108 receives a standby state indication, it outputs a band allocation command signal to the band allocation control means 109 to get band allocation information. The upward band allocation according to this band allocation information is one as shown in FIG. 4D. Here, the bands allocated to the remote unit 22 are so allocated that they may report transmission line monitoring information between the station unit 1 and the remote unit 22, and unit monitoring information of the remote unit 22 to the station unit 1. Next, the operation will be described when the standby detection means 210 in the remote unit 22 detects a standby state release under this state.

When the standby state detection means 210 inputs a standby state release signal, the monitoring control cell processing means 208 gives a standby state release indication on upward monitoring control cells to output them to the cell multiplex means 205.

When the monitoring control cell processing means 108 in the station unit 1 receives a standby state release indication, it outputs a band allocation command signal to the band allocation control means 109 to get band allocation information. Upward band allocation according to this band allocation information is again one as shown in FIG. 4C.

And when the power-off detection means 209 in the remote unit 22 detects a power-off state, the monitoring control cell processing means 208 inputs a power-off indication signal from the power-off state detection means 209, and gives a power-off state indication on upward monitoring control cells to output them to the cell multiplex means 205.

When the monitoring control cell processing means 108 in the station unit 1 receives a power-off state indication, it outputs a band allocation command signal to the band allocation control means 109 to get band allocation information. Upward band allocation according to this band allocation information is again one as shown in FIG. 4A.

Next, with reference to FIGS. 1 and 2, other embodiment of this invention will be described. In case of a structure where one uses no detection of user cell processing in the user cell processing means 204 during a certain period as a standby state detection means 210 in the remote unit 2n so as to output a standby state indication signal, one may get the same effect as one in the embodiment. In this case, one can detect a standby state release by using the generation of upward user cells as a trigger.

In this case, however, in addition to the effect mentioned above, there is another effect that the remote unit 2n need not be provided with a standby state switch.

The first effect of this invention is that by providing the state of a remote unit with a standby state, one can monitor the transmission line and the remote unit saving the power consumption in this state, as compared with that in a normal state. The reason for this is because in the standby state the operational circuit range in the remote unit is limited, as compared with that in a normal state.

The second effect is that by switching the remote unit to a standby state, the bands allocated to the remote unit concerned until then, are allocated to other remote unit in a normal state so that upward bands may be more effectively used. The reason for this is because the structure of the station unit is so made that the reception of a standby state indication may automatically reset the upward band allocation.

And, the third effect is that by switching the remote unit to a standby state, the time necessary for restarting user cell communication is shortened, as compared with that in case where the power is turned off. The reason for this is because there is no need of distance measurement control for the remote unit when one switches from the standby state to the standby-released state.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A transmission system comprising: a plurality of remote units in communication with a station unit, wherein said communication is with fixed length cells in the upward direction from said remote units to the station unit by a TDMA system, and in the downward direction from the station unit to said remote units by a TDM system, wherein said station unit is adapted to detect whether one of said plurality of remote units is in a standby state and is responsive to a detection of one of said plurality of said remote units being in a standby state to allocate bands of communication from the remote unit in the standby state to a remote unit in a normal state.

2. The transmission system of claim 1, further comprising a coupler for coupling and dividing optical signals.

3. The system of claim 1, wherein said station unit is further adapted to periodically transmit and receive monitoring information from said plurality of remote units which have been detected to be in a standby state to monitor the state of a transmission line with said remote units in the standby state.

4. The system of claim 3, wherein said station unit is further adapted to rearrange the band allocation between the plurality of remote units based upon said monitoring information.

5. The system of claim 1, wherein the standby state for each of said plurality of remote units is adapted to reduce power consumption.

6. A transmission system comprising: a plurality of remote units in communication with a station unit, wherein said communication is with fixed length cells in the upward direction from said plurality of remote units to the station unit by a TDMA system, and in the downward direction from the station unit to said plurality of remote units by a TDM system, wherein each of said plurality of remote units is adapted to periodically transmit and receive monitoring control cells to and from said station unit while in a standby state, wherein said station unit is adapted to respond to the monitoring control cells to monitor the state of transmission line and the state of the remote unit, and to allocate the bands from each remote unit in a standby state to a remote unit in a normal state, excluding the bands for transmitting upward monitoring control cells, and further responsive to a monitoring control cell which indicates the release of a standby state in a remote unit to allocate bands to said released remote unit to a normal state.

7. The transmission system of claim 6, further comprising a coupler for coupling and dividing optical signals.

8. A station unit for a transmission system including a plurality of remote unit in communication with a station unit in star form, said communication being with fixed length cells in the upward direction from said remote units to the station unit by a TDMA system, and in the downward direction from the station unit to remote units by a TDM system, the station unit comprising:

a wavelength separating and multiplexing means for separating the upward signal input from said remote unit and the downward signal output to said remote unit;

an upward signal reception means for receiving the upward signal after the signal separation;

a cell division means for dividing the received signal into user cells and monitoring control cells;

a band control means for controlling band allocation according to a band allocation command signal to output the band allocation information;

a monitoring control cell processing means for executing terminal processing in response to one of a transmission-line warning and a remote-unit warning in an upward monitoring control cell input from said cell division means, and for outputting said band allocation command signal including band allocation information in response to receiving a monitoring control cell indicating one of a power-off state and a standby state of a remote unit;

a user cell processing means for terminal processing of user cells input from said cell division means and generation processing of user cells;

a cell multiplex means for executing multiplex processing of user cells from said user-cell processing means and monitoring control cells from said monitoring control cell processing means; and a downward signal transmission means for transmitting an output of the cell multiplex means via said cell division means.

9. A remote unit for a transmission system including a plurality of remote units in communication with a station unit in star form, each communication being in fixed length cells in the upward direction from said plurality of remote units to the station unit by a TDMA system, and in the downward direction from the station unit to said plurality of remote units by a TDM system, said remote unit comprising:

a wavelength separating and multiplexing means for separating the downward signal received from said station unit and the upward signal output to said station unit;

a downward signal reception means for receiving the downward signal after the signal separation;

a cell division means for dividing the received signal into user cells and monitoring control cells;

a power-off monitoring means for detecting a power-off state of said remote unit:

a standby state detection means for detecting said remote unit being in a standby state;

a monitoring control cell processing means for outputting a cell transmission command signal based upon said downward monitoring control cells including band allocation information received from said cell division means, and for generating an upward monitoring control cells based upon at least one of a power-off indication signal from said power-off monitoring means and a standby state indication signal from said standby state detection means;

a user cell processing means for terminal processing of user cells input from said cell division means and for generation processing of user cells;

a cell multiplex means for executing cell multiplex processing of user cells from the user cell processing means and monitoring control cells from said monitoring control cell processing means according to a cell transmission command signal from said monitoring control cell processing means; and an upward signal transmission means for transmitting an output of the cell multiplex means concerned via said cell division means.

10. The remote unit of claim 9, wherein said standby state detection means comprises a standby state switch.

11. The remote unit of claim 9, wherein said standby state detection means outputs said standby state indication signal by detecting that no user cell processing is executed in said user cell processing means during a certain period.

12. A station unit for a transmission system including a plurality of remote unit in communication with a station unit in star form, said communication being with fixed length cells in the upward direction from said remote units to the station unit by a TDMA system, and in the downward direction from the station unit to remote units by a TDM system, the station unit comprising:

a wavelength separator and multiplexor adapted to separate the upward signal input from said remote unit and the downward signal output to said remote unit;

an upward signal receiver adapted to receive the upward signal after the signal separation;

a cell divider adapted to divide the received signal into user cells and to monitor control cells;

a band controller adapted to control band allocation according to a band allocation command signal to output the band allocation information;

a monitoring control cell processor adapted to execute terminal processing in response to one of a transmission-line warning and a remote-unit warning in an upward monitoring control cell input from said cell divider, and to output said band allocation command signal including band allocation information in response to receiving a monitoring control cell indicating one of a power-off state and a standby state of a remote unit;

a user cell processor adapted to terminal process user cells input from said cell divider and to generate process user cells;

a cell multiplexor adapted to execute multiplex processing of user cells from said user-cell processor and monitoring control cells from said monitoring control cell processor; and a downward signal transmitter adapted to transmit an output of the cell multiplex unit via said cell divider.

13. A remote unit for a transmission system including a plurality of remote units in communication with a station unit in star form, each communication being in fixed length cells in the upward direction from said plurality of remote units to the station unit by a TDMA system, and in the downward direction from the station unit to said plurality of remote units by a TDM system, said remote unit comprising:

a wavelength separator and multiplexor adapted to separate the downward signal received from said station unit and the upward signal output to said station unit;

a downward signal receiver adapted to receive the downward signal after the signal separation;

a cell divider adapted to divide the received signal into user cells and monitoring control cells;

a power-off monitor adapted to detect a power-off state of said remote unit:

a standby state detector adapted to detect said remote unit being in a standby state;

a monitoring control cell processor adapted to output a cell transmission command signal based upon said downward monitoring control cells including band allocation information received from said cell divider, and for generating an upward monitoring control cells based upon at least one of a power-off indication signal from said power-off monitor and a standby state indication signal from said standby state detector;

a user cell processor adapted to terminal process user cells input from said cell divider and to generate process of user cells;

a cell multiplexor adapted to execute cell multiplex processing of user cells from the user cell processor and monitoring control cells from said monitoring control cell processor according to a cell transmission command signal from said monitoring control cell processor; and an upward signal transmitter adapted to transmit an output of the cell multiplexor via said cell divider.

* * * * *